United States Patent [19]

McMahan et al.

[11] Patent Number: 4,761,717

[45] Date of Patent: Aug. 2, 1988

[54] HEADLAMP PIVOT ASSEMBLY

[75] Inventors: David R. McMahan; Harry S. Murphy; William E. Nagengast, Jr., all of Anderson, Ind.

[73] Assignee: General Motors Corporation, Detroit, Mich.

[21] Appl. No.: 39,945

[22] Filed: Apr. 20, 1987

[51] Int. Cl.⁴ .............................................. B60Q 1/04
[52] U.S. Cl. ........................................ 362/66; 362/80; 362/420; 362/428
[58] Field of Search ............... 248/635; 267/141.3, 267/141.4, 141.7; 362/66, 61, 88, 418, 420, 422, 423, 424, 425, 426, 428; 403/228, 226, 390

[56] References Cited

U.S. PATENT DOCUMENTS

| | | |
|---|---|---|
| 2,814,722 | 11/1957 | Diedring . |
| 2,911,522 | 11/1959 | Mears . |
| 3,050,621 | 8/1962 | Spencer . |
| 3,065,342 | 11/1962 | Worden . |
| 3,823,314 | 7/1974 | Germany . |
| 3,878,389 | 4/1975 | Puyplat . |
| 3,932,837 | 1/1976 | Baker . |
| 4,196,459 | 4/1980 | Dick . |
| 4,277,818 | 7/1981 | Urbaneck et al. . |
| 4,306,276 | 12/1981 | Dick ................................. 362/66 |
| 4,318,162 | 3/1982 | Sip . |
| 4,333,131 | 6/1982 | Hujimoto et al. . |
| 4,345,307 | 8/1982 | Mayer . . |
| 4,503,486 | 3/1985 | Makita ............................... 362/66 |
| 4,554,617 | 11/1985 | Tyler ................................. 362/61 |
| 4,665,469 | 5/1987 | Furfari et al. ..................... 362/66 |

FOREIGN PATENT DOCUMENTS

| | | | |
|---|---|---|---|
| 0058312 | 8/1982 | European Pat. Off. ............. | 362/66 |
| 3028700 | 2/1982 | Fed. Rep. of Germany ........ | 362/66 |
| 1528018 | 4/1968 | France ............................... | 362/66 |
| 261739 | 12/1985 | Japan ................................. | 362/66 |
| 486030 | 5/1938 | United Kingdom ................ | 362/66 |
| 1427387 | 3/1976 | United Kingdom . | . |

Primary Examiner—Ira S. Lazarus
Assistant Examiner—Sue Hagarman
Attorney, Agent, or Firm—Edward J. Biskup

[57] ABSTRACT

A support shoe for pivotably supporting a portion of a lamp body within a support frame and allowing the lamp body to be adjustably aimed in vertical and horizontal planes, characterized in that the support shoe includes a stud which carries a resilient body received by a slot in the support frame in a manner that allows the support shoe to serve as a pivot assembly.

7 Claims, 2 Drawing Sheets

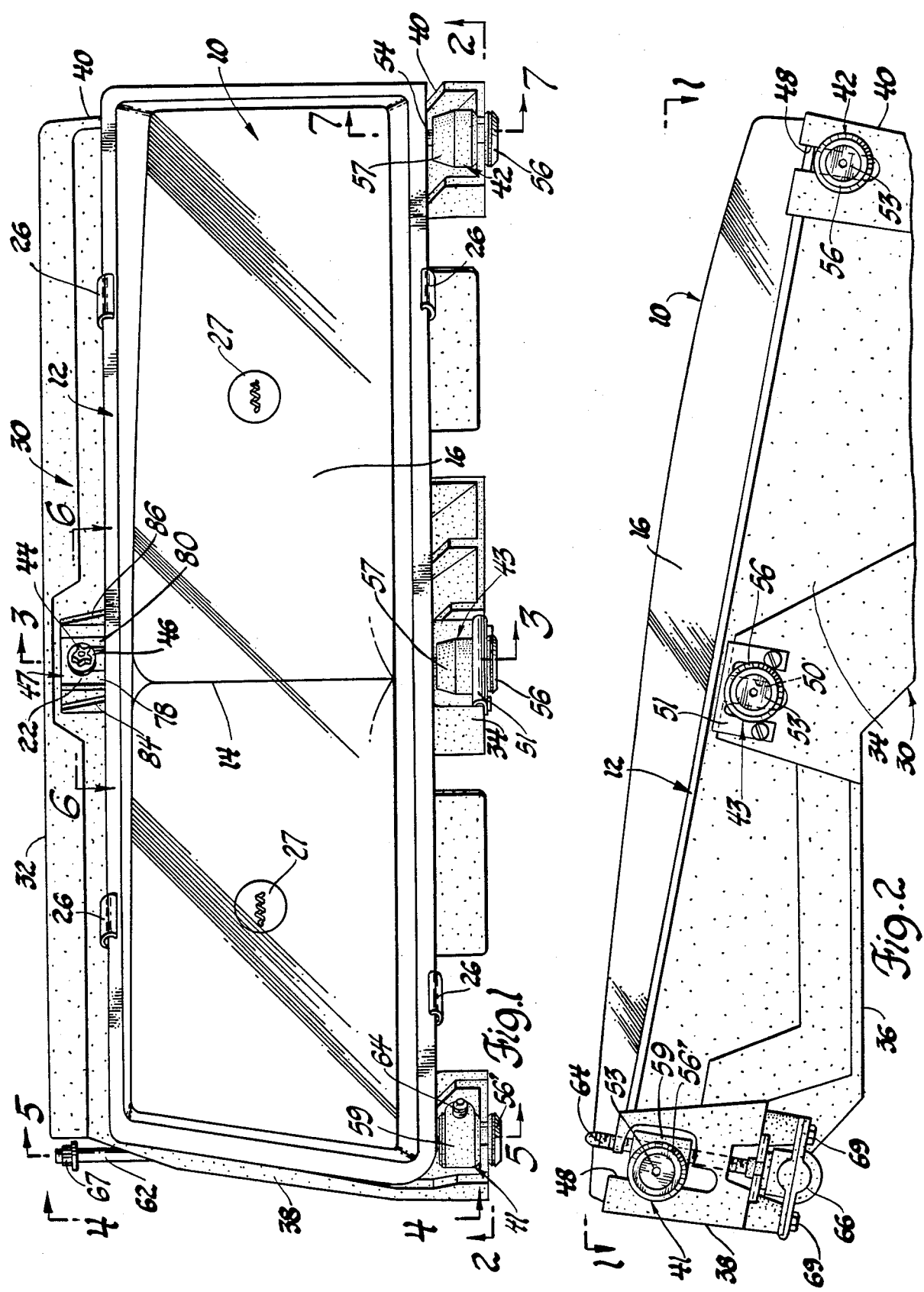

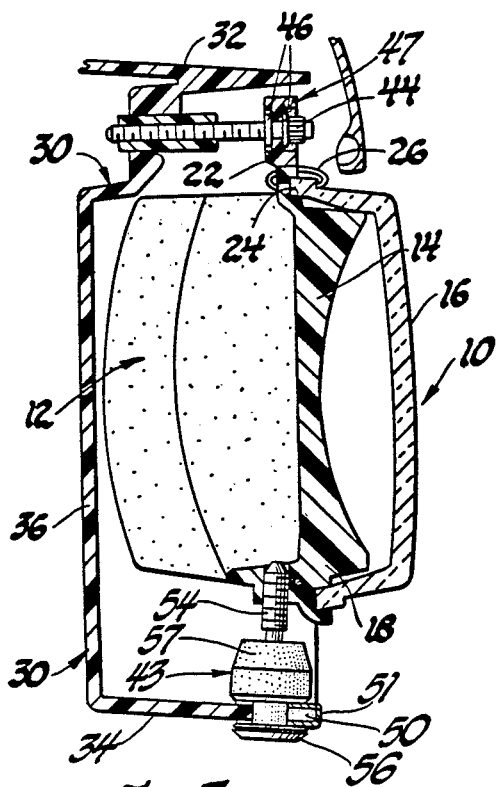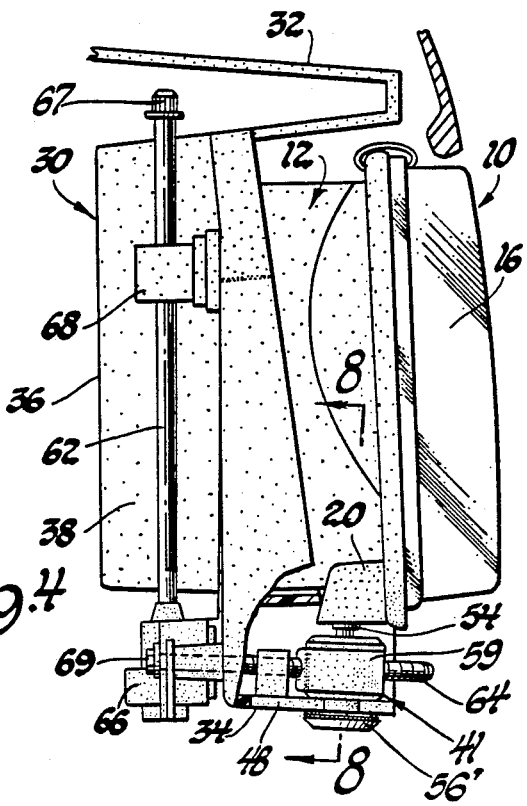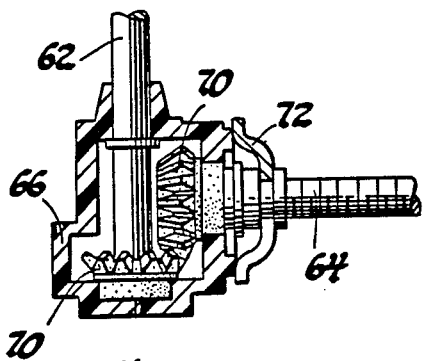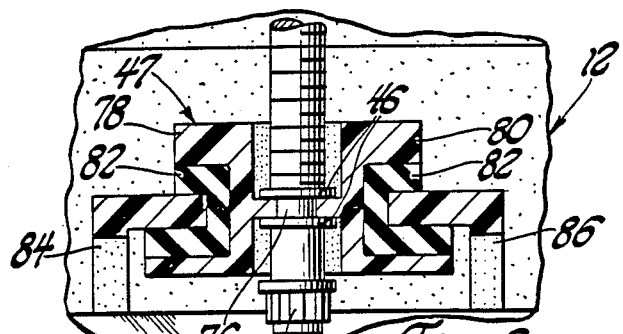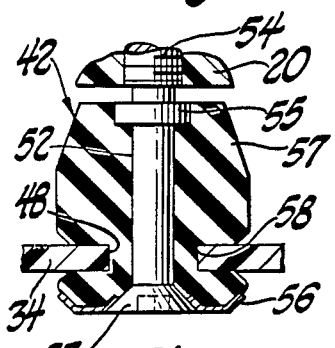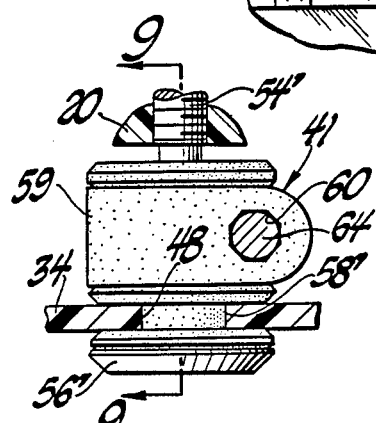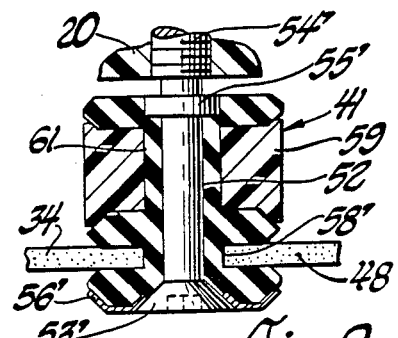

HEADLAMP PIVOT ASSEMBLY

This invention relates to vehicle headlamps and more particularly to a pivot assembly adapted to support a portion of a headlamp body within a support frame for sliding and/or pivotable movement so as to permit selective adjustable movement of the lamp body about a horizontal axis and a vertical axis.

Copending patent application U.S. Ser. No. 886,150 filed on July 16, 1986 in the name of Van Duyn et al and assigned to the assignee of this invention discloses a support shoe for pivotally connecting a headlamp body to a support frame that includes a plastic block member and retaining member each of which is provided with a spherical surface, so when the two members are interconnected, a socket is formed for the ball portion of a ball stud mounted on the headlamp body.

The present invention concerns a new and improved support shoe that can serve the same function as the support shoe seen in the above application without requiring separable parts. As a result, the invention not only decreases the time for assembling the headlamp body to the support frame but also helps decrease the overall cost of manufacturing a composite headlamp assembly. More specifically, the support shoe according to the present invention is adapted to be slidably received by a slot formed in the lower forwardly extending wall of a support frame in which the lamp body is supported for adjustable movement about a vertical axis and a horizontal axis. The support shoe can either be connected to screw adjustment means carried by the support frame or serve merely as a support about which the lamp body can pivot or slide within the slot during adjustment movement of the lamp body. In each case, the support shoe is a single unit comprising a metal stud the shank of which at its upper end is threaded so as to permit fastening to the lamp body. The lower end of the shank is formed with an enlarged head on which a dish shaped member or grommet rests. Located between the threaded portion of the shank and the grommet, a barrel shaped resilient member composed of an elastomeric material is molded around the stud and is formed with an annular groove that allows the support shoe to be slidably and sealingly received by the slot in the support frame. In the modified version of the support shoe which is connectable to an adjustment screw, the barrel shaped member is formed with a pair vertically spaced annular grooves, the lower one of which cooperates with the aforementioned slot in the support frame while the upper groove accommodates a plastic member enclosing the associated groove and having an offset bore formed therein for threadably receiving the adjustment screw. In both versions of the support shoe, the arrangement of parts is such that the stud can cooperate with the grommet to allow the support shoe to serve as a pivot assembly for the lamp body.

These and other objects, features and advantages of the invention will be apparent from the following specification and from the drawings wherein:

FIG. 1 is a front elevational view of a vehicle headlamp assembly having a headlamp supported within a housing according to the present invention.

FIG. 2 is a bottom view, partially broken away, taken along the plane indicated 2—2 in FIG. 1;

FIG. 3 is a sectional view taken along the plane indicated 3—3 in FIG. 1;

FIG. 4 is an end view taken along the plane indicated 4—4 in FIG. 1;

FIG. 5 is an enlarged sectional view taken along the plane indicated 5—5 in FIG. 1;

FIG. 6 is an enlarged sectional view taken along the plane indicated 6—6 in FIG. 1;

FIG. 7 is an enlarged sectional view of one of the support shoes taken along the plane 7—7 in FIG. 1;

FIG. 8 is an enlarged frontal of another form of support shoe view taken on line 8—8 of FIG. 4; and FIG. 9 is a sectional view taken on line 9—9 of FIG. 8.

Referring now to the drawings and specifically FIGS. 1-3, a so-called styled headlamp assembly for upscale automotive vehicle bodies is shown made according to the invention. Such assembly is similar to the assembly shown in copending patent application G-7, entitled Vehicle Headlamp Assembly, filed concurrently with this application in the name of McMahan et al, and assigned to the assignee of this invention. As seen in FIGS. 1-3, this headlamp assembly includes a headlamp body 10, comprised of an elongated, dish-like, multiple cavity rectangular reflector member 12, the two side-by-side cavities of which are separated by a web or webs 14, and the open front face of which is closed by a glass or like material lens element 16. As viewed best in FIG. 3, the reflector member 12 may be molded of a suitable polymer, particularly to include a variety of thickened portions for provision of mounting details as will be described. Such thickened portions include a region 18 at the lower margin of the reflector member 12 adjacent web 14, and similar such regions 20, FIG. 4, at opposite lateral ends of the reflector member 12. Reverting to FIG. 3, another thickened flange area 22 is provided above the web 14. Suitable grooving or channeling, as at 24, is provided around the entire margin of the open face of the reflector member 12 to receive the flange like margins of the lens element 16. An adhesive and sealant such as butyl may be added at the inner face of the lens flange to prevent the ingress of foreign material and the lens 16 element is fixedly retained on the reflector member 12 by means such as clips 26. Conventional lamp bulbs 27 may be provided, as is well known, in each of the reflector cavities for low beam, high beam or parking lamp illumination selected at the will of the driver.

As also seen in FIGS. 1-3 the lamp includes a box-like support frame, generally designated as 30. This support frame 30 may also be fabricated of a polymer material molded to a shape, such as shown, preferably providing spaced horizontally extending upper and lower walls 32 and 34, respectively, joined by a back wall 36 and by opposite end walls 38 and 40. Support frame 30 is suitably affixed to the front body structure, not shown, of the vehicle body by whatever conventional means desired.

The lamp body 10 is in turn mounted on support frame 30 by a pair of slideable support shoes or connectors 41 and 42, and a stationary support shoe or connector 43, as seen best in detail in FIGS. 3, 4, 7, and 8 as well as by an upper adjustable fastener 44. Fastener 44 is a threaded element having a head suitably tooled for reception of a hand adjusting device, such as a screwdriver, and having a threaded shank screwed into a thickened portion of the back wall 36 of the support frame 30. The head portion of the fastener 44 has spaced shoulders 46 which are captured by a retainer member 47 connected to the reflector member 12 in region 22.

The fastener 44 and retainer member 47 together serve as a connector with the fastener 44 in the illustrated case, being accessible from the front of the vehicle and normally hidden, for example, by the lower marginal edge of the lip of the vehicle hood.

Referring to FIG. 2 and to FIGS. 6 and 7, the lower wall 34 of frame 30 is slotted at the end regions thereof as at 48 to receive the support shoes 41 and 42. Similarly, midway between the support shoes 41 and 42 the lower wall 34 of the support frame 30 is also slotted as at 50 to receive the support shoe 43 which is restrained from axial movement in the accommodating slot 50 by a clip 51 secured to the support frame 30. Although support shoe 43 cannot move axially along the slot 50, it does serve as a universal pivot allowing the headlamp body 10 to be rotatably adjusted about a vertical axis and tilted about a horizontal axis as will be explained hereinafter.

It will be noted that support shoes 42 and 43 are identical in size and construction, and as best seen in FIG. 7, each support shoe 42 and 43 includes a metal stud 52 the lower end of which is formed with a frusto-conical head 53 and the upper end of which is integral with a threaded shank 54. Spaced below the threaded shank 54 is a collar 55 integrally formed with the stud 52, and resting on the head 53 is a metal grommet 56. Between the collar 55 and the grommet 56, a barrel shaped body 57 of elastomeric material is molded around the stud 52. An annular groove 58 is formed in the body 57 so as to allow each of the support shoes 42 and 43 to be slid into the associated slot formed in the support frame 30. As seen in FIGS. 1 and 3, threaded shanks 54 of the support shoes 42 and 43 are screwed into the thickened regions 20 and 18, respectively, of the reflector member 12.

As seen in FIGS. 8 and 9, the support shoe 41 is similar in construction to the support shoes 42 and 43 and therefore the identical parts of support shoe 41 are identified by corresponding reference numerals but primed. Support shoe 41 differs from support shoes 42 and 43 in that a plastic body member 59 is provided that has a threaded bore 60 formed therein. In this case, the body member 59 is located in an enlarged annular groove 61 formed in the elastomeric body 57' above the annular groove 58'. The body member 59 fills the groove 61 and the bore 60 formed therein is offset from and located along an axis normal to the longitudinal center axis of the stud 52.

It should be apparent from the above description that the lower portion of the reflector member 12 is resiliently supported by the support shoes or connectors 41, 42, and 43, each of which also serves as a pivot. Thus, the lower portion of the studs are located in a horizontal plane of the support frame 30 and together through their centers define an instantaneous axis of rotation for aiming adjustment of the lamp body 10 in vertical planes. Such adjustment is of course effected by manipulated rotation of fastener 44 by a screwdriver or the like. Aiming or adjustment of lamp body 10 in the horizontal planes, on the other hand, about a vertical center axis is effected by manipulation of the shoe 41. The vertical axis for such horizontal adjustment is established by the shouldered head of fastener 44 and the support shoe 43. As earlier mentioned, support shoes 41 and 42 are slideable within slots 48 of frame 30 to provide for adjustment of the lamp body 10. The slots 48 may, of course, be aligned generally on circular arcs centered on the vertical axis through the stud of support shoe 43.

Adjustment of support shoe 41 is effected by an angularly arranged adjustment apparatus, seen best in FIG. 4. The present exemplary embodiment illustrates one case of a desired orientation for the apparatus, including a pair of orthogonally arranged shafts 62 and 64 which are interconnected in a housing 66. The vertical shaft 62 has a head 67 located adjacent the upper wall 32 of the support frame 30 at a location easily manipulated by a hand screwdriver or the like, and arranged for rotation within a support clip 68 attached to the back wall 36 of the support frame 30. The lower end of shaft 62 extends into the gear housing 66 which is likewise suitably attached to the back wall as by screws 69. As seen best in FIG. 5, the lower end of shaft 62 has mounted thereto one of a pair of bevel gears 70 which are meshed and suitably journaled in circular recesses of the gear housing 66. The other of the bevel gears 70 is mounted at the internal end of the other shaft 64 and the gears are held in meshing engagement by means of a spring clip 72 inserted between a wall of the gear housing and a shoulder of shaft 64. As illustrated, the shaft 64 has a majority of its length threaded, and as seen best in FIG. 7, such threaded length of the shaft is threadably engaged in the threaded bore 60 of the shoe 41.

Thus, a selected rotation by a screwdriver or the like applied to the head 67 of shaft 62 will cause rotation of the lower threaded shaft 64 within its gear housing 66, resulting in a sliding adjustment of the engaged support shoe 41 and its opposite shoe 42 fore or aft in their slots 48, so that the headlamp body 10 is adjusted or aimed relative to frame 30 about the vertical axis defined on the shoe 43 and the shouldered head of fastener 44 as hereinbefore described.

It will be noted that as seen in FIGS. 1 and 6, the retainer member 47 associated with the fastener 44 is generally U-shaped having a key-holed shaped opening 74 which receives and retains in a snap-in fashion the cylindrical portion 76 of the fastener 44. The retainer member 47 is formed with a pair of integral and laterally spaced legs 78 and 80 which are U-shaped in cross-section. Each of the legs 78 and 80 is formed with a vertically extending groove or channel which fixedly accommodates a U-shaped elastomeric element 82 so as to allow the retainer 47 to slide on and be supported by a pair of laterally spaced upstanding arms 84 and 86 integrally formed with the upper portion of the reflector member 12. Thus, the retainer member 47 together with the shoes 41, 42 and 43 serve as connectors which include an elastomeric material located between the lamp body 10 and the support frame 30 for resiliently supporting the lamp body 10 and thereby cushioning the latter from shock. In addition, by properly sizing the annular grooves 58 and 58' of the shoes 41, 42 and 43, a sealing effect is provided within the slots 48 and 50, between the upper and lower surfaces of the associated wall 34 and the areas of the groove 58,58' contacting such surfaces, as seen in FIGS. 7-9. This sealing effect helps prevent grit or mud from entering this area and possibly causing an abrasive wearing of the surfaces.

Finally, it will be noted that even though the shoe 42 is provided in this vehicle headlamp assembly, it will be possible to eliminate such shoe 42 and still permit proper support and adjustment of the lamp body 10, although if the shoe 42 is removed and due to the overhang of the headlamp at one end, some stability of the headlamp may be sacrificed particularly if the vehicle experiences an excessive amount of vibration. Also, it will be understood that when the shaft 64 is rotated for adjusting the lamp body 10 about a vertical axis, the shoe 43 and particularly the body 57 together with the stud 52 will rotate about the vertical center axis of the latter. In addition, when the fastener 44 is manually rotated, the shoes 41, 42 and 43 will act as pivots allowing the lamp body to rotate about the aforementioned horizontal axis. In this regard, it will be noted that the grommet 56,56' merely rests on the associated head 53,53' of the stud 52 and is not fastened thereto. As a result, the threaded shank 54, as seen in FIG. 7, can be tilted to the right or to the left, and even if the grommet 56 should contact the lower surface of the lower wall 34, further tilting movement is not prevented because the head 53 can be skewed relative to its accommodating opening in the grommet 56.

Various changes in modifications can be made in this construction without departing from the spirit of the invention. Such changes and modifications are contemplated by the inventors and they do not wish to be limited except by the scope of the appended claims.

The embodiments of the invention in which an exclusive property or privilege is claimed as defined as follows:

1. A support shoe for a vehicle headlamp assembly having a lamp body received within a support frame for pivotal adjustable movement about a horizontal axis and a vertical axis, said support frame having a lower wall formed with at least one slot located therein, said support shoe including a metal stud the shank of which has its upper end formed so as to permit fastening of said support shoe to said lamp body, an enlarged head formed at the lower end of said shank, a grommet supported by said head, a resilient member molded around the stud between the threaded portion of said shank and said grommet, and an annular groove formed in said resilient member for allowing said support shoe to be slidably and sealingly received by said slot in said support frame.

2. In combination with a vehicle headlamp assembly having a lamp body received by a support frame and including pivot means between said support frame and said lamp body aligned on a substantially vertical axis about which said lamp body is adapted for rotatable adjustment relative to said support frame, a guidance slot in said support frame positioned to one side of said vertical axis and generally aligned on an arc originating on said vertical axis, a support shoe slidably received in said slot to support said lamp body on said frame and adapted to be connected to an adjustment means which effects adjustment of said lamp body about said vertical axis, said support shoe including a metal stud secured to the lamp body and terminating with an enlarged head, an elastomeric material molded around said stud and being formed with a pair of vertically spaced annular grooves, a plastic body member located within and enclosing one of said grooves and having a bore formed therein in a position offset from and along an axis normal to the longitudinal axis of said stud for receiving said adjustment means, and the other of said grooves adapted to be located within said guidance slot so as to allow sliding movement of said support shoe upon movement of said lamp body about said vertical axis.

3. The support shoe of claim 2 wherein said enlarged head is frusto-conical in configuration.

4. The support shoe of claim 2 wherein said adjustment means is a threaded member.

5. A support shoe for a vehicle headlamp assembly having a lamp body received within a support frame for a pivotal adjustable movement about a horizontal axis and a vertical axis, said support frame having a lower wall formed with a slot located along said vertical axis, said support shoe including a metal stud the shank of which has its upper end formed with threads so as to permit fastening of said support shoe to said lamp body, an enlarged head formed at the lower end of said shank, a grommet supported by said head, a barrel-shaped resilient member molded around the stud between the threaded portion of said shank and said grommet, and an annular groove formed in said resilient member for allowing said support shoe to be slidably and sealingly received by said slot in said support frame.

6. The support shoe of claim 3 wherein said enlarged head is frusto-conical in configuration.

7. The support shoe of claim 5 wherein said shank is formed with an annular collar located below said threads formed on the upper end of said shank.

* * * * *